US011018914B2

(12) United States Patent
Kunert et al.

(10) Patent No.: US 11,018,914 B2
(45) Date of Patent: May 25, 2021

(54) TRANSMITTER, METHOD, DEVICE, RECEIVER AND COMPUTER PRODUCT FOR THE WIRELESS TRANSMISSION OF ADDITIONAL INFORMATION SIGNALS

(71) Applicant: INSTITUT FUR RUNDFUNKTECHNIK GMBH, Munich (DE)

(72) Inventors: Clemens Kunert, Unterfoehring (DE); Andreas Sieber, Kirchheim (DE); Hermann Lipfert, Oberhaching (DE); Swen Petersen, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 109 days.

(21) Appl. No.: 16/321,737

(22) PCT Filed: Jul. 15, 2018

(86) PCT No.: PCT/EP2018/069183
§ 371 (c)(1),
(2) Date: Jan. 29, 2019

(87) PCT Pub. No.: WO2019/016108
PCT Pub. Date: Jan. 24, 2019

(65) Prior Publication Data
US 2019/0165977 A1  May 30, 2019

(30) Foreign Application Priority Data

Jul. 19, 2017  (IT) .................. 102017000082050

(51) Int. Cl.
*H04L 27/26* (2006.01)
*H04L 5/00* (2006.01)
(Continued)

(52) U.S. Cl.
CPC ........ *H04L 27/2607* (2013.01); *H04L 5/0053* (2013.01); *H04L 25/00* (2013.01);
(Continued)

(58) Field of Classification Search
CPC ............................ H04L 5/0007; H04W 84/12
See application file for complete search history.

(56) References Cited

U.S. PATENT DOCUMENTS

2005/0271088 A1* 12/2005 Shoemake ............ H04L 27/261
370/528
2014/0355626 A1  12/2014 Fechtel
(Continued)

OTHER PUBLICATIONS

International Search Report dated Oct. 11, 2018, issued in PCT Application No. PCT/EP2018/069183, filed Jul. 15, 2018.

*Primary Examiner* — Hassan Kizou
*Assistant Examiner* — Hector Reyes
(74) *Attorney, Agent, or Firm* — Workman Nydegger

(57) ABSTRACT

Provided is a transmitter for the wireless transmission of an additional information signal, which is configured to transmit the additional information signal in response to a control signal that corresponds to a transmission time within a guard interval of a wirelessly transmitted primary information signal originating from another transmitter, the transmitter being adapted to wirelessly transmit the additional information signal at the transmission time within the guard interval of the primary information signal. Furthermore, methods for transmitting and receiving and a corresponding receiver and computer program product are the subject of the present disclosure.

19 Claims, 10 Drawing Sheets

(51) Int. Cl.
*H04L 25/00* (2006.01)
*H04N 21/61* (2011.01)
*H04W 84/12* (2009.01)

(52) U.S. Cl.
CPC ........ *H04N 21/6112* (2013.01); *H04L 5/0007* (2013.01); *H04W 84/12* (2013.01)

(56) References Cited

U.S. PATENT DOCUMENTS

| | | | |
|---|---|---|---|
| 2017/0135078 A1* | 5/2017 | Lim | H04L 5/0044 |
| 2018/0019848 A1* | 1/2018 | Lomayev | H04L 27/2636 |
| 2019/0068341 A1* | 2/2019 | Seo | H04W 72/0446 |
| 2019/0132838 A1* | 5/2019 | Yl | H04W 72/0446 |
| 2019/0268817 A1* | 8/2019 | Seo | H04W 36/08 |

* cited by examiner

TRANSMITTER, METHOD, DEVICE, RECEIVER AND COMPUTER PRODUCT FOR THE WIRELESS TRANSMISSION OF ADDITIONAL INFORMATION SIGNALS

BACKGROUND OF THE INVENTION

1. The Field of the Invention

The present invention relates to a transmitter, a method, a device, a receiver and a computer product for wirelessly transmitting and receiving additional information signals within a guard interval of another wirelessly transmitted primary information signal.

2. The Relevant Technology

The wireless transmission of information signals is known in the art. It is also known that guard intervals may be used in the wireless transmission of information signals to counteract negative effects on the reception quality of information signals at the receivers, which may be particularly caused by interference, reflections, or echo phenomena resulting from runtime differences in the wireless transmissions of multi-transmitter systems.

SUMMARY OF THE INVENTION

The present invention is directed at enabling the wireless transmission and reception of an additional information signal to increase the overall payload data-rate.

According to a first aspect, the present invention provides a transmitter for the wireless transmission of an additional information signal, wherein the transmitter is configured to transmit the additional information signal in response to a control signal that corresponds to a transmission time within a guard interval of a wirelessly transmitted primary information signal, wherein the primary information signal originates from another transmitter, and the transmitter according to the invention is adapted to wirelessly transmit the additional information signal at the transmission time within the guard interval of the primary information signal. According to the invention, the transmission of the additional information signal depends on the guard intervals or on the superposition of the guard intervals which are arranged within the primary information signal. In this regard, the term "primary information signal" is intended to refer to all kinds of information signals which are wirelessly transmitted by one or more transmitters and where the transmitter side uses guard intervals. The transmitter according to the invention is configured to transmit the additional information signal as a function of time overlaps of guard intervals of another information signal, which is designated throughout this specification as "primary information signal" for ease of reference. Here, the transmission time for transmitting the additional information signal corresponds to the guard intervals of the primary information signal. The transmitter according to the invention is thus configured in a way that a control signal which corresponds to the temporal occurrence of guard intervals of the primary information signal is processed and used for transmitting the additional information signal. Hence, the transmitter according to the invention has a control signal interface for transmitting the additional information signal and the control signal depends on the temporal occurrence of the guard intervals of the primary information signal. For clarity, the term guard interval is specified in the following, because different definitions are used in the technical literature. According to the present invention, the term guard interval refers to a time window in the information signal or primary information signal, which is used as a spacer between the symbols of the primary information signal for improved reception of the primary information signal. The guard interval may either be completely free of any symbols or signal components or comprise a proportion of signal elements.

The above-mentioned first aspect of the present invention provides the advantage that an additional information signal can be broadcasted in areas with a guard interval having a reserve. As a result, the data throughput is increased in an advantageous manner. In addition, instead of using an additional frequency range, the same frequency range of the primary information signal is more fully exploited, so that the frequency spectrum, as a resource, remains unaffected or better used. The term "reserve" means that a provisioned or upcoming guard interval may be location-wise or time-wise too large, so that in accordance with the invention, the existing reserve can be exploited in a better way.

According to another aspect of the present invention, the transmitter has a processing unit to receive and process the primary information signal and to derive the control signal corresponding to the transmission time so that the additional information signal can be transmitted at the transmission time within the guard interval of the primary information signal. In this case, a processing of the primary information signal takes place in order to detect the built-in guard intervals within the primary information signal and, based thereon, derive control signals which determine sending the additional information signal in time.

In accordance with the invention, there is also proposed a transmitter which is configured to transmit an information signal composed of parts of the primary information signal and the additional information signal, wherein the transmitter is adapted to transmit the additional information signal within the guard interval of the primary information signal. In this case, the payload of the primary information signal, in particular the symbols, is/are preferably derived from the primary information signal and transmitted with an additional information signal as a composite information signal. Thus, a new signal is generated and transmitted because not only the additional information signal but also the symbols from the primary information signal are broadcasted by the transmitter.

According to a further aspect of the invention, the transmitter has an interface for receiving an external control signal, wherein the external control signal corresponds to the transmission time within the guard interval of the primary information signal, so that the additional information signal can be sent out at the transmission time within the guard interval of the primary information signal. In this case, the transmitter according to the invention is supplied with an external control signal, such that the transmitter does not by itself detect guard intervals by receiving and processing the primary information signal. This has the advantage that a purposeful provision of the control signal takes place and also that a coupling with a transmitter transmitting a primary information signal may be realized (which is particularly relevant in the case of a single primary transmitter). In addition, the transmitter transmitting the primary information signal may also transmit a directional signal, which allows the transmitter according to the invention to transmit the additional information signal in a synchronized manner.

According to a further aspect of the invention, the transmitter is configured to emit at least one auxiliary signal within the guard interval of the primary information signal, wherein the auxiliary signal is designed to improve a receiver-side receiving, processing or recognizing of the additional information signal. Here, an auxiliary signal is envisaged, which allows for improving the reception quality of the additional information signal. To this end, known techniques, such as cyclic prefix (CP) or other types of signals may be used.

In accordance with the invention, the additional information signal and the primary information signal are furthermore substantially in the same frequency range, in particular in an OFDM-based system, such as the DVB-T standard, the LTE standard, the WiFi/WLAN standard or the DAB standard. The invention assumes that the additional information signal and the primary information signal are in the same frequency range because it may also be used for constellations which generally cause an undesired mutual interference between the additional information signal and the primary information signal, although they do not lie in the same or adjacent frequency ranges.

Furthermore, according to the invention, a method is proposed for the wireless transmission of an additional information signal, the method comprising the steps of: wirelessly transmitting the additional information signal in response to a control signal, the control signal corresponding to a transmission time within a guard interval of a wirelessly transmitted primary information signal, to transmit the additional information signal in response to the control signal. The aforementioned method may further include a step of receiving and processing the primary information signal and deriving the control signal corresponding to the guard interval from the primary information signal to wirelessly transmit the additional information signal in response to the control signal at the desired transmission time. In addition, the aforementioned methods may include a step of receiving an external control signal. Furthermore, the aforementioned methods including the associated variants and alternatives may comprise a step of transmitting an auxiliary signal, wherein the auxiliary signal is designed in such a way as to improve a receiver-side processing or recognizing of the additional information signal. Furthermore, devices are proposed which are configured to carry out one of the methods listed above, in particular a repeater, a telephone, a smart phone, a notebook, a tablet PC, a radio, a router, a WiFi/WLAN router, a gateway or a cable television headend.

According to a further aspect of the invention, a receiver for wirelessly receiving an additional information signal and a primary information signal is proposed, wherein according to the invention the additional information signal is arranged within a guard interval of the primary information signal.

Further advantageously, the receiver is adapted to process an auxiliary signal of the additional information signal within the guard interval of the primary information signal, wherein the auxiliary signal is configured such as to improve a receiver-side deriving, recognizing or processing of the additional information signal.

Further advantageously, the additional information signal and the primary information signal furthermore lie substantially in the same frequency range, in particular in an OFDM-based system, such as the DVB-T standard, the LTE standard, the WiFi/WLAN standard or the DAB standard.

Further advantageously, the receiver has a switch for selecting the additional information signal and/or the primary information signal, wherein the switch is at least partially made of hardware elements and/or software elements, and wherein the receiver is, in particular, a TV, a Smart TV, a HbbTV, a phone, a mobile phone, a smart phone, a notebook, a tablet, a smart watch or a radio. The switch can be, for example, an on-screen display, menu item and may be operable via a button or touch-sensitive.

Further according to the invention, a method is proposed for receiving a wirelessly transmitted additional information signal, the method comprising a step of receiving and deriving the additional information signal and a wirelessly transmitted primary information signal, wherein the additional information signal is arranged within a guard interval of the primary information signal, and a further step of detecting and processing the additional information signal and/or the primary information signal.

Further according to the invention, a method is proposed with a further step of receiving and processing an auxiliary signal, wherein the auxiliary signal is assigned to the additional information signal and is arranged within the guard interval of the primary information signal, in order to improve deriving, recognizing, or processing of the additional information signal. This means that the aforementioned auxiliary signal contributes to deriving, recognizing, or processing of the additional information signal and is generated and transmitted specifically for this purpose.

Further, a method is provided with a step of providing a switch for selecting the additional information signal and/or the primary information signal for processing. The switch according to the invention allows, particularly at a receiver, selecting deriving, recognizing, or processing the primary information signal and/or additional information signal.

According to another aspect of the present invention, there is provided a computer program product embodied on a machine-readable medium implementing a method according to one of the methods proposed herein, carrying out one of the methods.

Preferably, there is the advantage that both, novel devices for processing information signals transmitted in accordance with the invention and legacy devices which are not provided with the inventive technology will be able to process corresponding signals because the primary information signal is still processable by legacy devices, as long as it is ensured that corresponding symbols can be derived from the primary information signal. In addition, devices according to the invention can process both the primary information signal and the additional information signal.

BRIEF DESCRIPTION OF THE DRAWINGS

In the following, the invention will be described in more detail with reference to the figures.

DETAILED DESCRIPTION OF THE PREFERRED EMBODIMENTS

Figure 1:
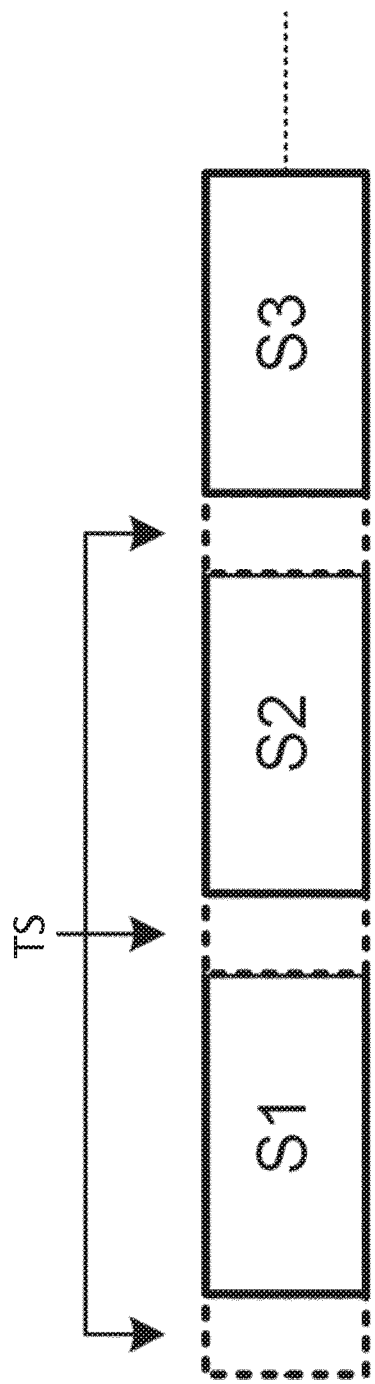
FIG. 1 shows a temporal structure of a primary information signal or a transmitted information signal according to the prior art.

FIG. 1 shows a temporal structure of a primary information signal according to the prior art. In this case, the primary information signal is composed of symbols S1, S2, and S3 which occur consecutively in time and are transmitted one after the other. FIG. 1 further shows three time slots TS: before the symbol S1, between the symbols S1/S2 and between S2/S3. The time slots TS are placed between two symbols, wherein the time slot TS before S1 is represented only for the sake of completeness and only provides a technical contribution if another symbol is placed before S1. The depicted time slots TS are free of signals. In addition, it should be noted that the time slot TS is sometimes referred to as a guard interval in the technical literature, although no signal is transmitted within the time slot TS.

Figure 2:
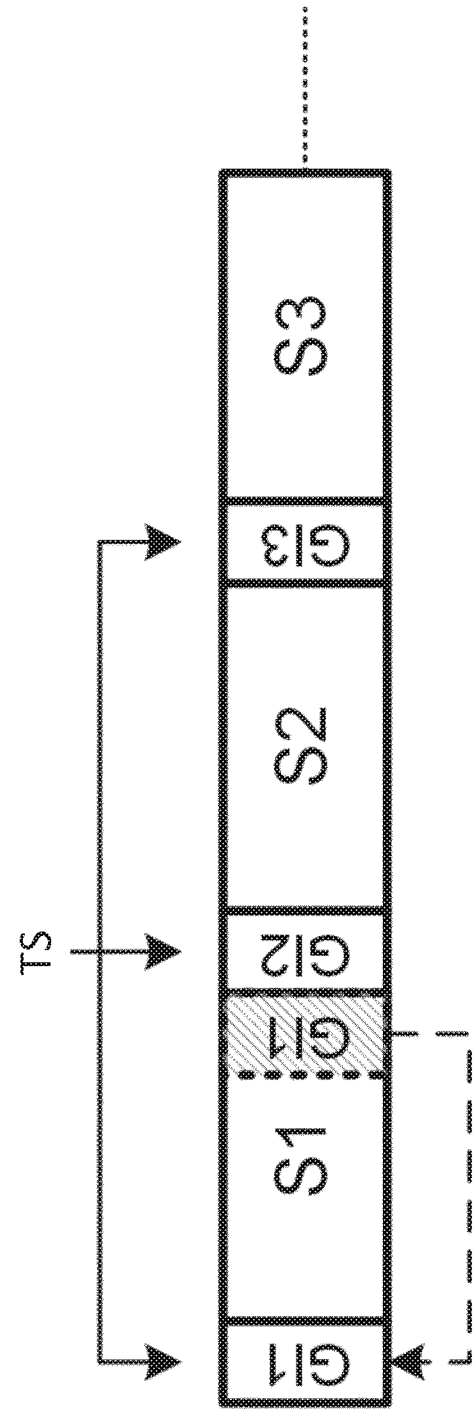
FIG. 2 shows a further temporal structure of a primary information signal according to the prior art using a guard interval.

FIG. 2 shows, analogously to FIG. 1, a further temporal structure of a primary information signal consisting of S1, S2, and S3 according to the prior art with additional use of a guard interval which at least partially comprises an information signal component. I.e., before the symbol S1 and between the symbols S1/S2 and S2/S3, a guard interval GI1, GI2, and GI3 is placed in the time slot TS. In contrast to FIG. 1, the guard interval GI1, GI2, and GI3 is at least partially provided with a signal component. The guard intervals GI1, GI2, and GI3 usually include a portion of one end of a symbol S1, S2, and S3 and are used, for example, for an autocorrelation method for deriving the entire symbol S1, S2, and S3.

Figure 3:
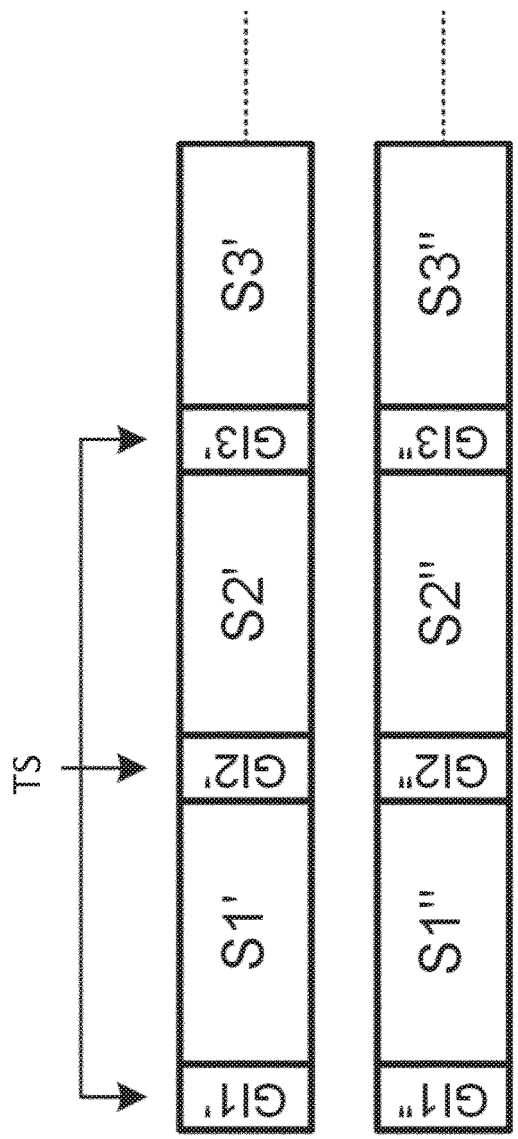
FIG. 3 shows a temporal structure of a synchronous transmission of two primary information signals according to the prior art using guard intervals.

FIG. 3 shows, analogously to FIG. 2, a temporal structure of a synchronous transmission of two primary information signals S1', S2', S3' and S1", S2", S3" using guard intervals GI1', GI2', GI3', and GI1', GI2', GI3', wherein the transmission of each of a primary information signal S1', S2', S3' and S1", S2", S3" is carried out via a separate transmitter. The guard intervals GI1', GI2', GI3' and GI1", GI2", GI3" are dimensioned such that when the two primary information signals S1', S2', S3' and S1", S2", S3" are received at the receiver at different time instants, the symbols S1', S2', S3' which are superimposed with S1", S2", S3" can still be derived.

Figure 4:
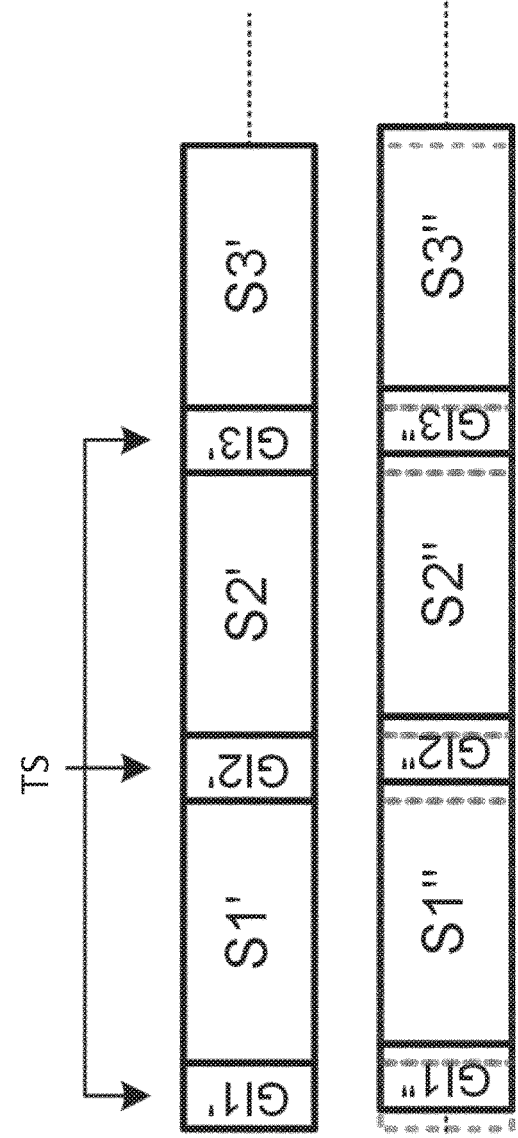
FIG. 4 shows, analogously to FIG. 3, a temporal structure of a time-shifted transmission and reception of two primary information signals according to the prior art using guard intervals.

FIG. 4 shows, analogously to FIG. 3, a temporal structure of a time-shifted transmission and reception of two primary information signals S1', S2', S3' and S1", S2", S3" using guard intervals GI1', GI2', GI3' and GI1", GI2", GI3" according to the prior art. In FIG. 4, the time offset is shown by hatched rectangles which symbolize GI1', GI2', GI3' in the primary information signal S1', S2', S3'.

Figure 5:
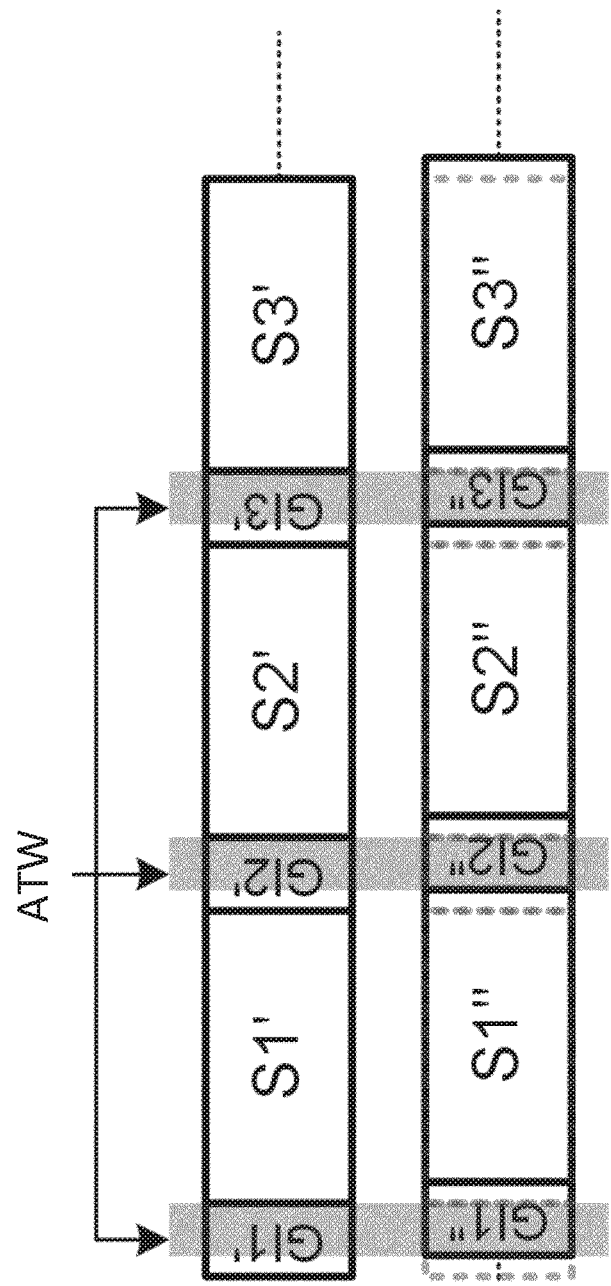
FIG. 5 shows, based on FIG. 4, a temporal structure of a time-shifted transmission and reception of two primary information signals according to the prior art, wherein an additional time window is arranged within a guard interval of the primary information signal for the transmission of an additional information signal, according to the invention.

FIG. 5 shows, based on FIG. 4, a temporal structure of time-shifted transmission and reception of two primary information signals S1', S2', S3' and S1", S2", S3" using guard intervals GI1', GI2', GI3' and GI1", GI2", GI3", wherein according to the invention, an additional time window ATW for transmitting an additional information signal is depicted. According to the invention, an additional information signal can be arranged and transmitted within the time window ATW. Preferably, the time window ATW is within time limits that are currently not used for transmitting symbols S1', S2', S3' and S1", S2", S3".

Figure 6:
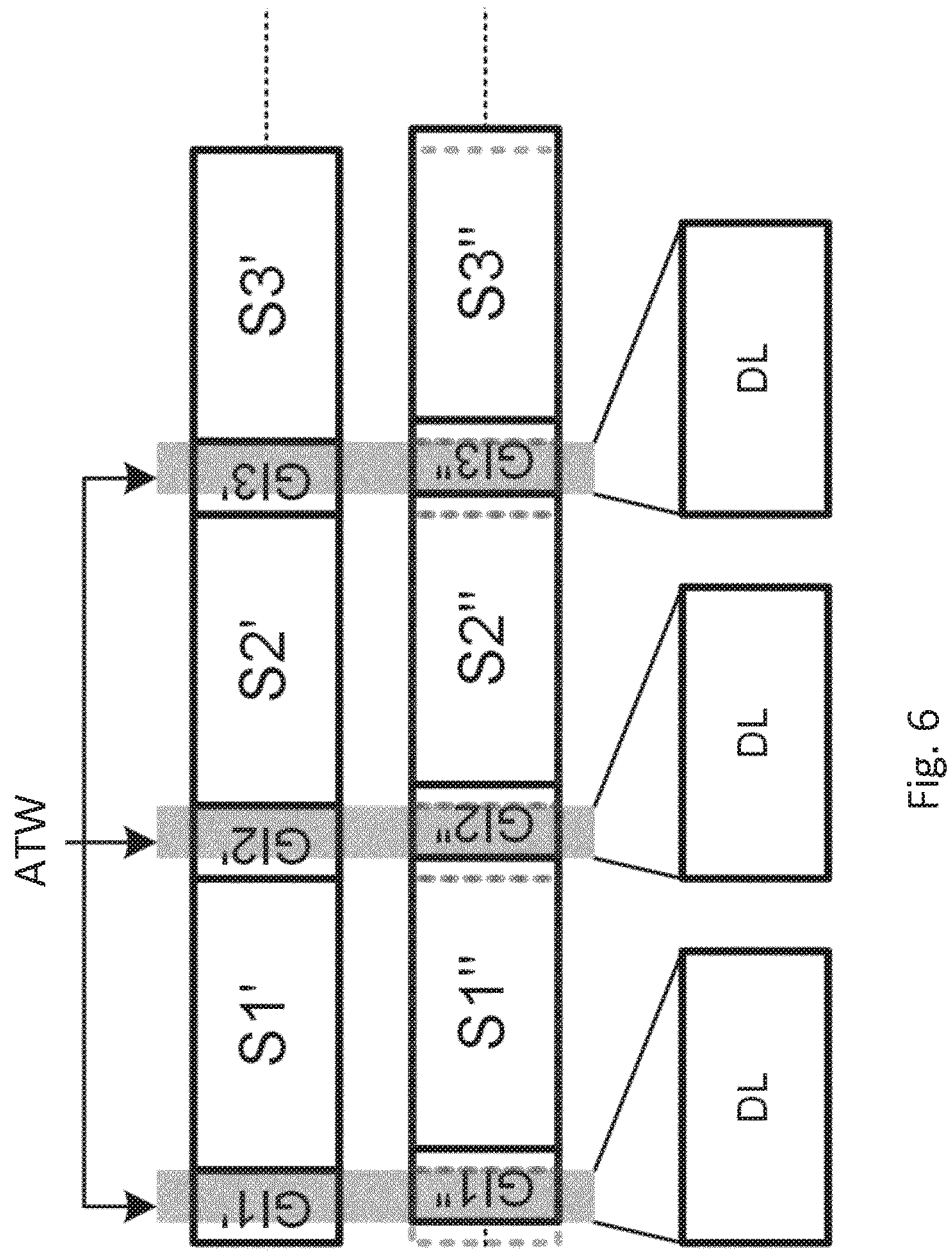
FIG. 6 shows an embodiment for transmitting additional information signals.
Figure 7:
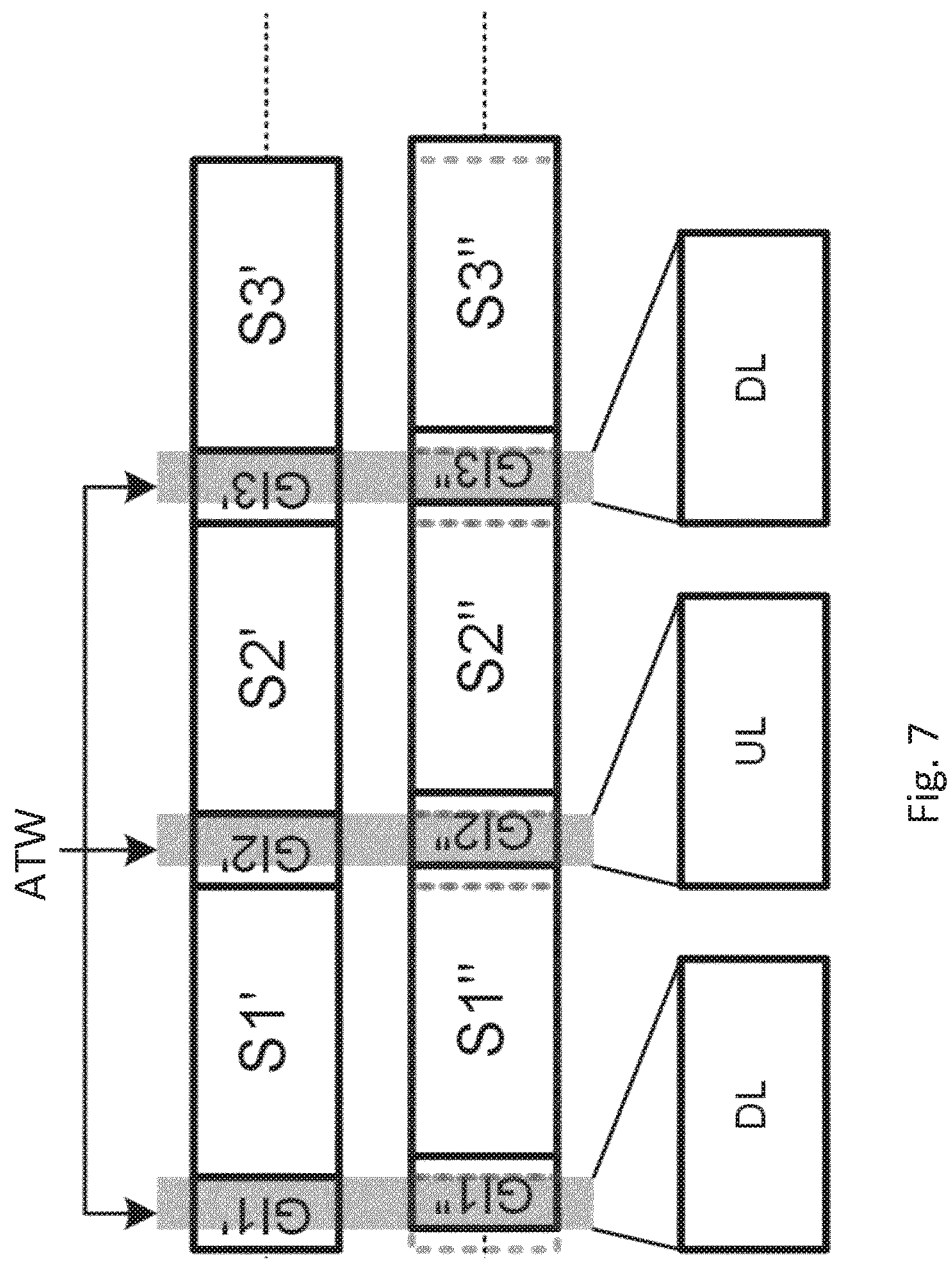
FIG. 7 shows a further embodiment for transmitting additional information signals.

FIG. 6 shows a transmission of additional information signals as DL (downlink) within the time window ATW according to the invention. According to the invention, the DL are transmitted within the time window ATW in an area non-overlapping with the symbols S1', S2', S3' and S1", S2", S3". According to the invention, as shown in FIG. 7, UP (uplink) signals may also be transmitted instead of DL (downlink) signals, so that a receiver according to the invention may use the time window ATW for transmitting UL analogously to a transmitter according to the invention. Furthermore, according to the invention, successive time windows ATW within a transmission of S1', S2', S3' and S1", S2", S3" can also be used arbitrarily or as required for a transmission of DL or UL.

Figure 8:
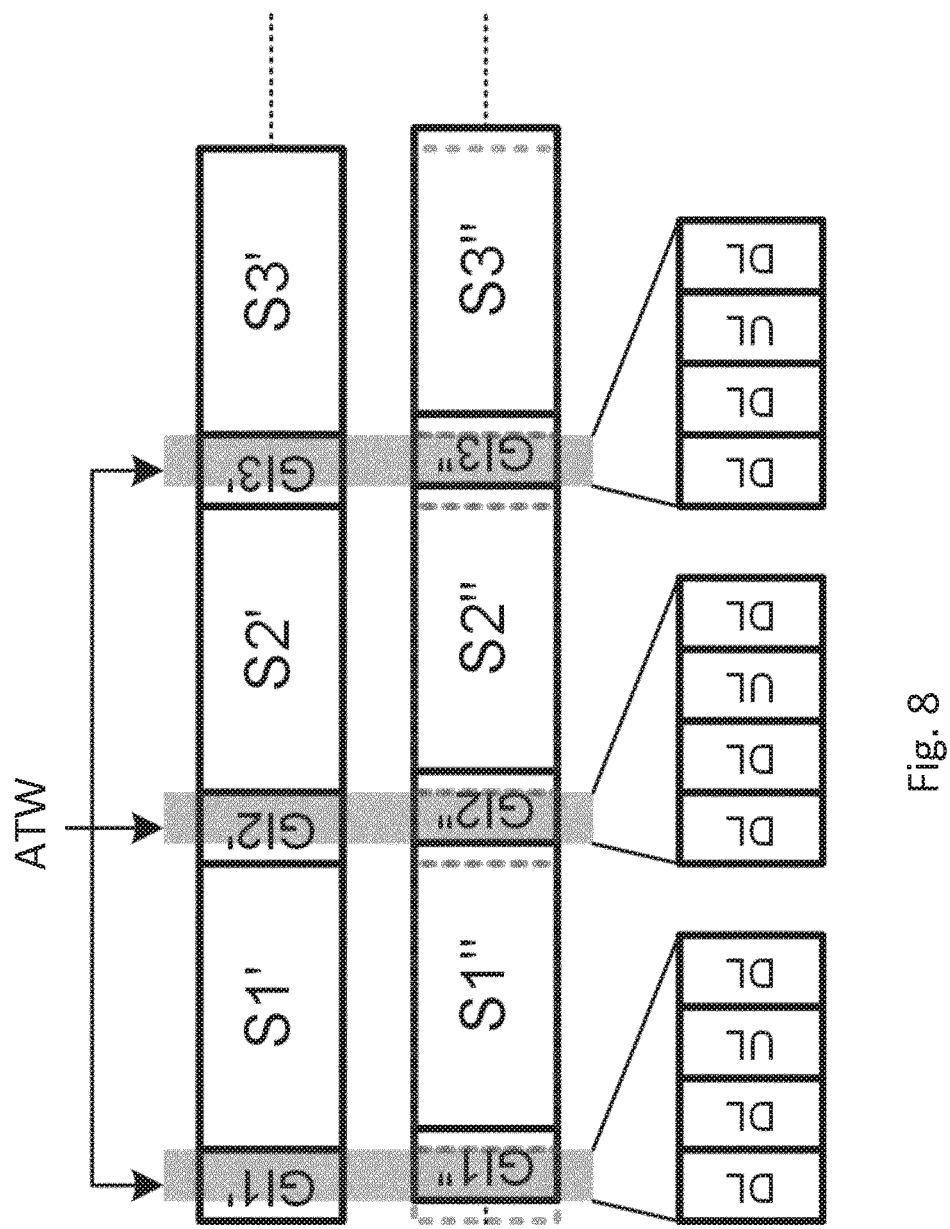
FIG. 8 shows a further embodiment for transmitting additional information signals.

FIG. 8 shows a further embodiment according to the invention, wherein a single time window ATW within the guard interval of a primary information signal is used both for a transmission of DL (downlink) and UL (uplink). In this case, according to the invention, a single ATW or time range within the guard interval of the primary information signal can be used arbitrarily or as needed for a combined transmission of DL and UL.

Figure 9:
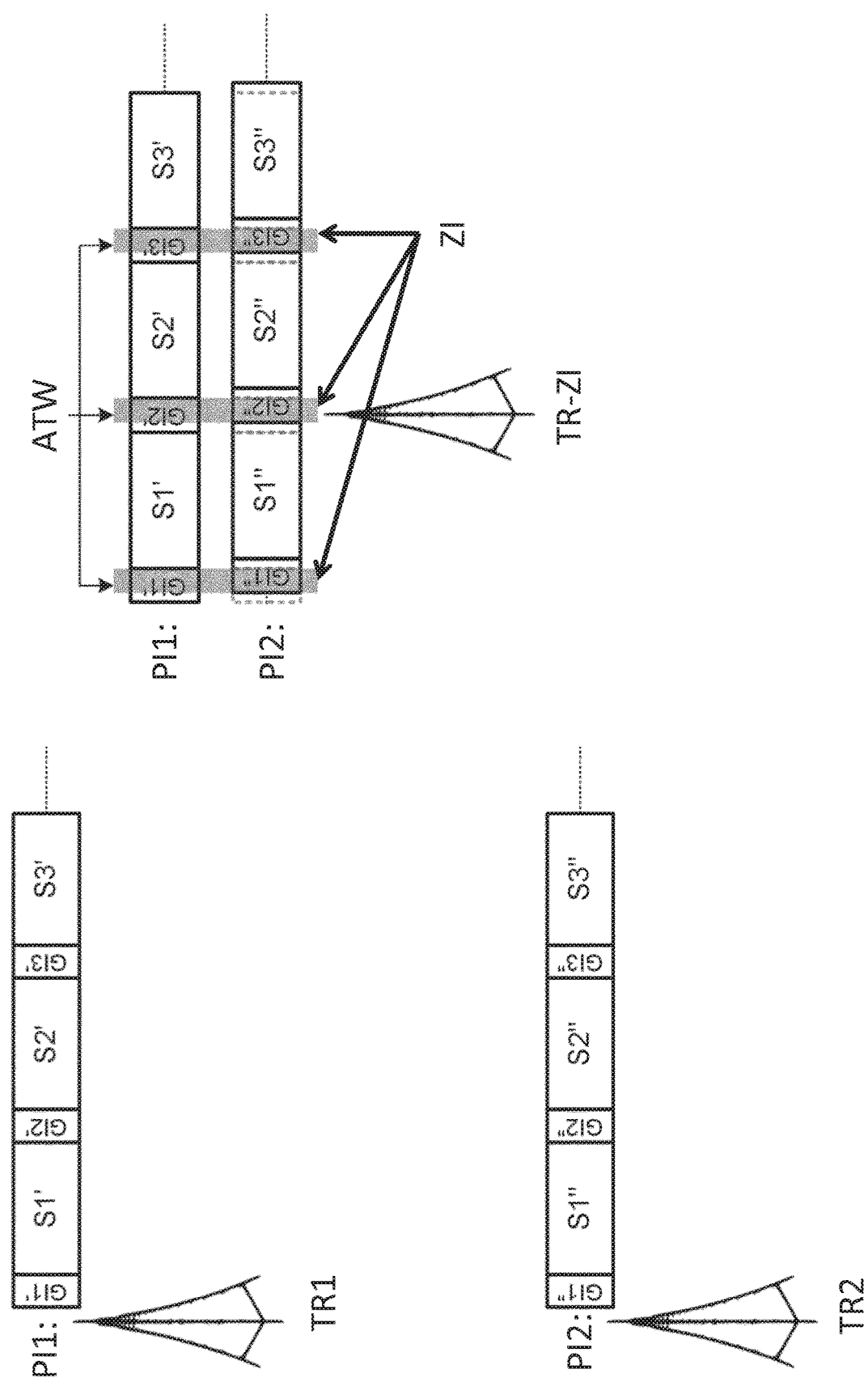
FIG. 9 shows an embodiment for transmitting additional information signals.

FIG. 9 shows a transmission of an additional information signal ZI according to the invention within the time window ATW by a transmitter TR-ZI according to the invention. This is done under the presumption of a first primary information signal PI1 transmitted by a first transmitter TR1 and a second primary information signal PI2 transmitted by a second transmitter TR2. As shown in FIG. 9, the transmitted primary information signals PI1 and PI2 arrive at the surroundings of the transmitter TR-ZI with a time-offset, the aforementioned time-offset being symbolized by dashed lines in the arrived primary information signal PI2 above the transmitter TR-ZI. According to the invention, the transmitter TR-ZI is configured to suitably place and transmit the additional information signal ZI within the time window ATW resulting from overlapping. Thus, according to the invention, there is a local transmission of additional information signals ZI using the available time windows ATW. Furthermore, according to the invention, the transmitter TR-ZI can also be located in an area which is substantially shielded or cut-off from the transmitted signals PI1 and PI2, e.g., indoors. In the aforementioned scenario, the transmitter TR-ZI according to the invention is configured to receive the primary information signal and to insert the additional information signal into the respective time window ATW in order to then transmit both, the primary information signal and the additional information signal. This results in further usage scenarios in accordance to the invention, in particular in areas in which a reception of primary information signals is not possible, but wherein an addition transmission of additional information signals is made possible according to the invention.

Figure 10:
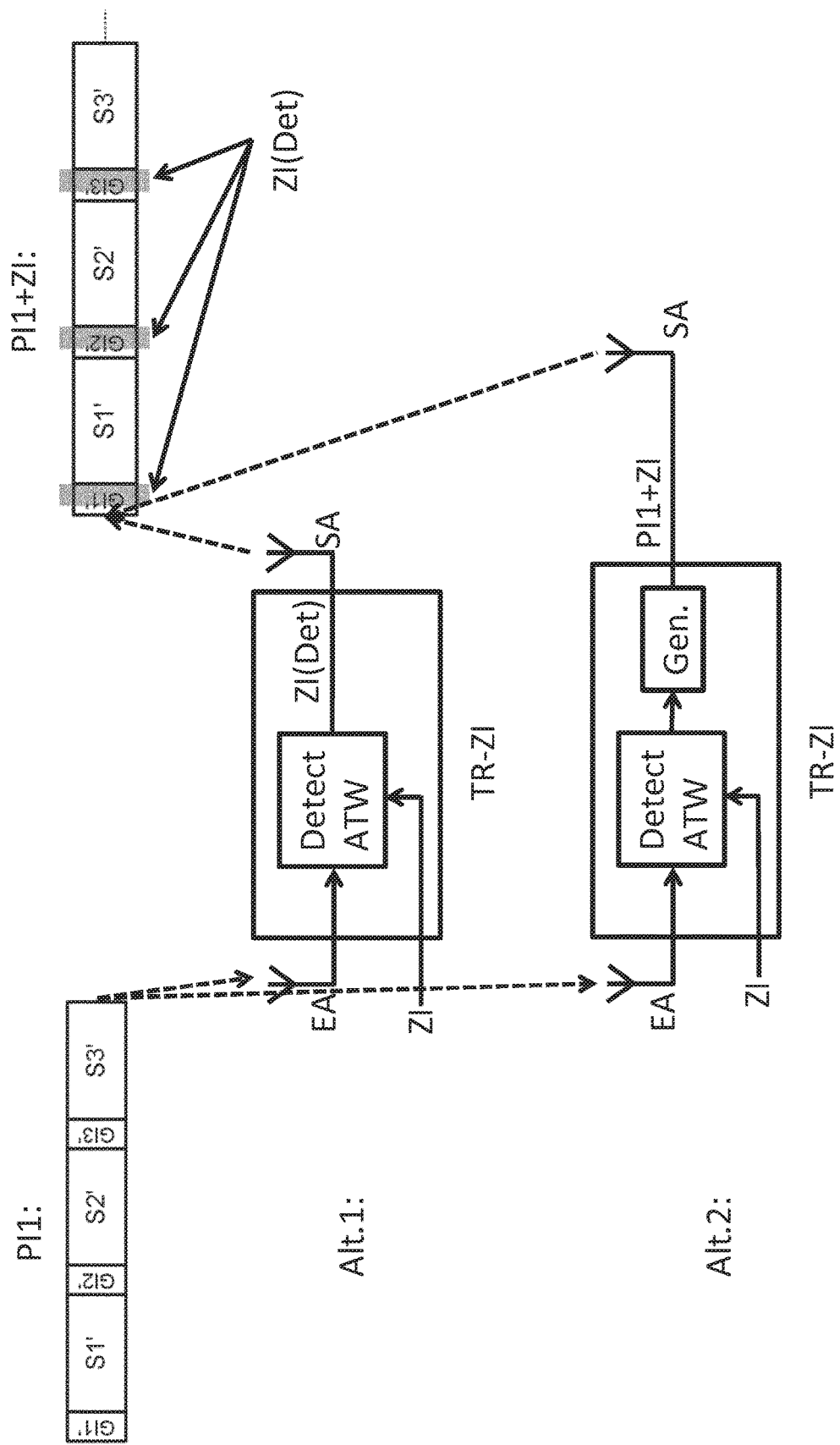
FIG. 10 shows a first alternative transmitter Alt.1 and a second alternative transmitter Alt.2 according to the present invention for transmitting an additional information signal.

FIG. 10 shows a transmitter TR-ZI according to a first and a second alternative Alt.1 and Alt.2 according to the invention for transmitting an additional information signal. The first alternative Alt.1 of the transmitter TR-ZI according to the invention comprises a receiving antenna EA for receiving a primary information signal PI1 with symbols S1', S2', and S3' with corresponding guard intervals GI1', GI2', and GI3' and a transmitting antenna SA for transmitting an additional information signal ZI within additional time windows ATW, thus transmitting the additional information signal ZI as a function of the detected additional time windows ATW. The transmitter TR-ZI has a further input ZI for receiving and processing an additional information signal ZI, wherein the input ZI can also be understood as an input realized within the transmitter TR-ZI, in particular as an internal input, which is configured to provide the additional information signal from a memory with a desired stored or supplied additional information signal to the transmitter TR-ZI. Furthermore, the transmitter TR-ZI has a detection unit Detect-ATW, wherein the detection unit Detect-ATW is configured to detect the additional time windows ATW within the primary information signal and to ensure a subsequent transmission of additional information signals ZI after the detection, symbolized as ZI(Det), at an appropriate time, to make an additional information signal ZI receivable within the guard intervals GI1', GI2' and GI3' of the primary information signal PI1 in addition to the primary information signal PH existing in the air. The transmitter TR-ZI according to the second alternative Alt.2 according to the invention is configured to use the received primary information signal PI1 not only for detecting additional time windows ATW, but to derive from the primary information signal PI1 at least the individual symbols S1', S2', and S3' and after adding the additional information signal ZI, to generate and transmit a completely new information signal consisting of PI1 and ZI/ZI(Det). In this case, the transmitter TR-ZI according to the second alternative Alt.2 comprises a generation unit GEN to provide, at the output, an information signal consisting of portions of the primary information signal PH and the additional information signal ZI, which is symbolized as PI1+ZI. Thus, there are two alternatives Alt.1 and Alt.2 according to the invention for transmitting additional information signals ZI, wherein the first alternative Alt.1 only detects suitable times for transmitting additional information signals ZI or guard intervals, and the second alternative processes the primary information signal PI further such that at least the symbols S1', S2', and S3' are derived and corresponding symbols or data of the additional information signal ZI are added, and a new information signal is created by this and transmitted. The additional information signal ZI is then arranged within the marked area located within GI1', GI2', and GI3'.

Figure 11:
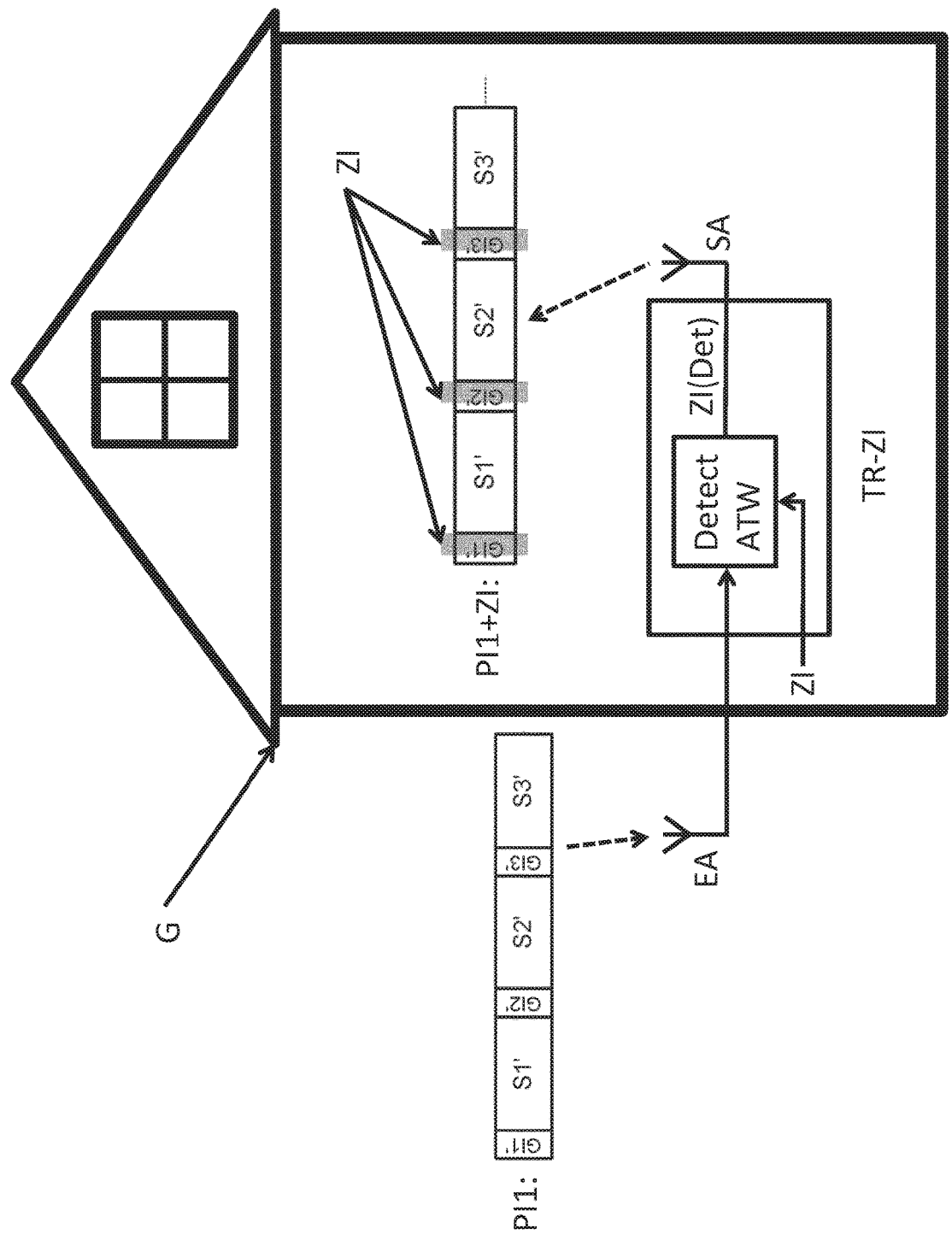
FIG. 11 shows a first alternative of a transmitter according to the invention for transmitting an additional information signal, the transmitter being arranged inside a building.

FIG. 11 shows a transmitter TR-ZI according to the first alternative Alt.1 according to the invention, as described in FIG. 10, wherein the transmitter TR-ZI is placed within a building G in such a way that a primary information signal PI from the outside is attenuatedly received within the building G or not received at all. In this case, however, the primary information signal PI is received by TR-ZI by means of the receiving antenna EA and provided to the transmitter TR-ZI as described in FIG. 10. The transmitted information signal PI1+ZI is then provided by transmitting the additional information signal ZI in time by means of the detection unit Detect ATW into the air. For the sake of completeness, it is pointed out that the transmitter according to the second alternative Alt.2 according to the invention, as described in FIG. 10, can also be used.

Figure 12:
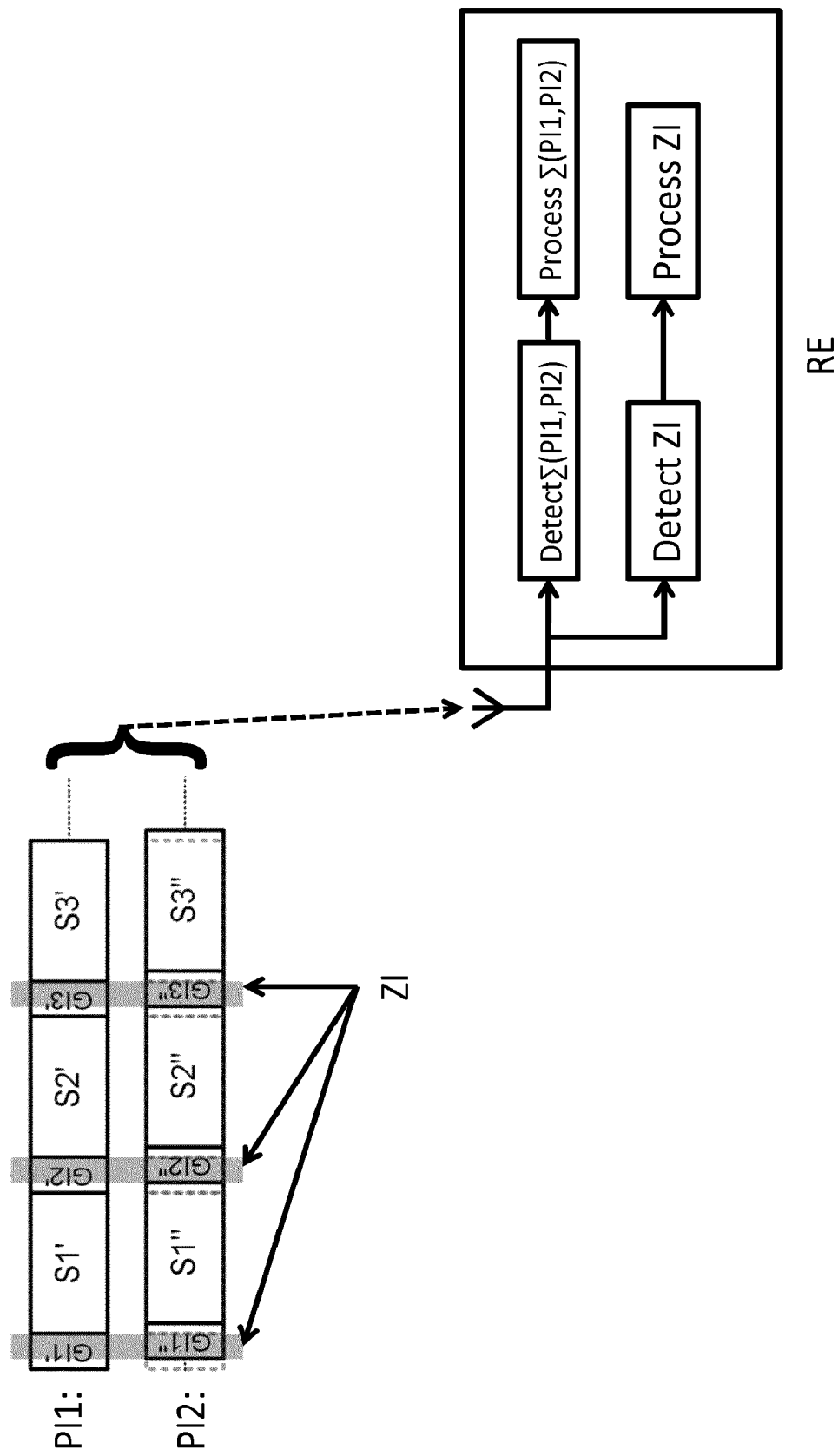
FIG. 12 schematically illustrates a structure of a receiver according to the invention for processing primary information signals and additional information signals that have been received.

FIG. 12 schematically illustrates a structure of a receiver RE according to the invention for processing received primary information signals Σ(PI1,PI2) and additional information signals ZI. In this case, it is assumed that the primary information signals PI1 and PI2 are transmitted by a plurality of transmitters, wherein, according to the invention, an additional information signal ZI is transmitted in at least one or more primary information signals PI1 and PI2, wherein the aforementioned signals do not arrive at the receiver RE at the same instant but with a temporal offset, as a superimposed signal Σ(PI1+ZI,PI2+ZI), as illustrated in FIG. 12. The receiver RE according to the invention is configured to perform a separate processing of the signals, so that both, the superimposed primary information signal Σ(PI1,PI2) and the additional information signal ZI can be detected, derived, and processed. The aforementioned processing stages are generally symbolized as DetectΣ(PI1, PI2), ProcessΣ(PI1, PI2), Detect Zi and ProcessZI in the respective blocks. In addition (not shown), the receiver RE according to the invention has a switch for making a selection between Σ(PI1,PI2) and/or ZI. Thus, an automatic or manual selection between the received signals Σ(PI1,PI2) and/or ZI for further processing and/or provision can be realized.

The invention claimed is:

1. A transmitter configured to wirelessly transmit an additional information signal, wherein the transmitter is configured to:
   receive a transmission of a first primary information signal and a transmission of a second primary information signal, wherein the first primary information signal includes a first set of guard intervals distributed between symbols of the first primary information signal and the second primary information signal includes a second set of guard intervals distributed between symbols of the second primary information signal;
   determine a time-shift exists between reception of the first primary information signal and reception of the second primary information signal, wherein the time-shift results in a partial, but not complete, overlap in time between when the first set of guard intervals occurs in the first primary information signal and when the second set of guard intervals occurs in the second primary information signal, wherein each said overlap in time constituting a time window; and
   only during each respective time window existing between one guard interval included in the first set of guard intervals and a corresponding one guard interval included in the second set of guard intervals, transmit the additional information signal in response to a control signal used to initiate transmission of the additional information signal, wherein, as a result of the time-shift, time windows are shorter in duration than guard intervals such that transmitting the additional information signal is performed during shorter time periods than time periods that are available for guard intervals.

2. The transmitter of claim 1, wherein the transmitter is configured to:
   receive and process the first primary information signal and the second primary information signal; and
   derive the control signal so that the additional information signal can be transmitted within the time windows.

3. The transmitter of claim 1, wherein the transmitter is configured to:
   transmit a composite information signal composed from parts of the first or second primary information signal and the additional information signal; and transmit the additional information signal within the guard intervals of the first or second primary information signal.

4. The transmitter of claim 1, wherein the transmitter has an interface for receiving an external control signal used to initiate transmission of the additional information signal.

5. The transmitter of claim 1, wherein the transmitter is configured to transmit at least one auxiliary signal within one or more guard intervals of the first primary information signal, and wherein the auxiliary signal is designed to improve a receiver-side deriving, processing, or recognizing of the additional information signal.

6. The transmitter of claim 1, wherein the additional information signal and the first or second primary information signals are furthermore essentially in a same frequency range, in particular in an OFDM-based system, a DVB-T standard, an LTE standard, a WiFi/WLAN standard or a DAB standard.

7. A method for wireless transmitting an additional information signal, the method comprising:
   receiving a transmission of a first primary information signal and a transmission of a second primary information signal, wherein the first primary information signal includes a first set of guard intervals distributed between symbols of the first primary information signal and the second primary information signal includes a second set of guard intervals distributed between symbols of the second primary information signal;
   determining a time-shift exists between reception of the first primary information signal and reception of the second primary information signal, wherein the time-shift results in a partial, but not complete, overlap in time between when the first set of guard intervals occurs in the first primary information signal and when the second set of guard intervals occurs in the second primary information signal, wherein each said overlap in time constituting a time window; and
   only during each respective time window existing between one guard interval included in the first set of guard intervals and a corresponding one guard interval included in the second set of guard intervals, transmitting the additional information signal in response to a control signal used to initiate transmission of the additional information signal, wherein, as a result of the time-shift, time windows are shorter in duration than guard intervals such that transmitting the additional information signal is performed during shorter time periods than time periods that are available for guard intervals.

8. The method of claim 7, wherein the method comprises the steps of:
   receiving and processing the first and second primary information signals; and
   deriving the control signal in order to wirelessly transmit the additional information signal within the time windows.

9. The method of claim 7, wherein the method comprises the steps of:
   processing the first and second primary information signals; and
   preparing and transmitting a new information signal from parts of the first or second primary information signals and the additional information signal, wherein it is envisaged to transmit the additional information signal within the time windows.

10. The method of claim 7, wherein the method comprises a step of receiving an external control signal.

11. The method of claim 7, wherein the method comprises a step of transmitting an auxiliary signal, wherein the auxiliary signal is designed in such a way as to improve a receiver-side processing or recognizing of the additional information signal.

12. A device configured to carry-out the method of claim 7, the device being a repeater, a telephone, a smart phone, a notebook, a tablet PC, a radio, a router, a WiFi/WLAN router, a gateway, or a cable television headend.

13. A receiver for wirelessly receiving an additional information signal and a primary information signal from a transmitter,
   wherein the additional information signal is arranged within a-guard intervals of the primary information signal,
   wherein the additional information signal is arranged within shortened time windows of the guard intervals such that time durations of the shortened time windows are shorter than time durations of the guard intervals,
   wherein the shortened time windows occur as a result of a time-shift that existed between reception of a first primary information signal at the transmitter, which first primary information signal includes a first set of guard intervals distributed between symbols of the first primary information signal, and reception of a second primary information signal at the transmitter, which second primary information signal includes a second set of guard intervals distributed between symbols of the second primary information symbol, the time-shift resulting in a partial, but not complete, overlap in time between when the first set of guard intervals occurs in the first primary information signal and when the second set of guard intervals occurs in the second primary information signal, each said overlap in time constituting a time window, and
   wherein the additional information signal is received by the receiver only during each respective time window existing between one guard interval included in the first set of guard intervals and a corresponding one guard interval included in the second set of guard intervals such that, as a result of the time-shift, time windows are shorter in duration than guard intervals and such that receiving the additional information signal is performed during shorter time periods than time periods that are available for guard intervals.

14. The receiver of claim 13, wherein the receiver is configured to process an auxiliary signal of the additional information signal within the guard intervals of the primary information signal, wherein the auxiliary signal is designed in such a way as to improve a receiver-side deriving, recognizing, or processing of the additional information signal.

15. The receiver of claim 13, wherein the additional information signal and the primary information signal lie substantially in a same frequency range, in particular in accordance with an OFDM-based system, a DVB-T standard, an LTE standard, a WiFi/WLAN standard or a DAB standard.

16. The receiver of claim 13, wherein the receiver has a switch for selecting the additional information signal and/or the primary information signal, wherein the switch is at least partially made of hardware elements and/or software elements.

17. A method for the wireless transmission of an additional information signal, the method comprising the following steps:

receiving and deriving the additional information signal and a wirelessly transmitted primary information signal from a transmitter, wherein the additional information signal is arranged within a guard interval of the primary information signal, and detecting and processing the additional information signal and/or the primary information signal, wherein the additional information signal is arranged within a shortened time window of the guard interval such that a time duration of the shortened time window is shorter than a time duration of the guard interval, wherein the shortened time window occurs as a result of a time-shift that existed between reception of a first primary information signal at the transmitter, which first primary information signal includes a first guard interval, and reception of a second primary information signal at the transmitter, which second primary information signal includes a second guard interval, the time-shift resulting in a partial, but not complete, overlap in time between when the first guard interval occurs in the first primary information signal and when the second guard interval occurs in the second primary information signal, said overlap in time constituting the shortened time window, and wherein the additional information signal is received by the receiver only during the shortened time window existing between the first guard interval and the second guard interval such that, as a result of the time-shift, the shortened time window is shorter in duration than the guard interval and such that receiving the additional information signal is performed during a shorter time period than a time period that is available for the guard interval.

18. The method of claim 17, the method further comprising the following step:

receiving and processing an auxiliary signal, wherein the auxiliary signal is assigned to the additional information signal and is arranged within the guard interval of the primary information signal, in order to improve deriving, recognizing, or processing of the additional information signal.

19. The method of claim 17, the method comprising the following step:

providing a switch for selecting the additional information signal and/or the primary information signal for processing.

* * * * *